United States Patent [19]

Vor

[11] 3,963,620
[45] June 15, 1976

[54] PURIFICATION FILTER FOR LIQUIDS

[75] Inventor: Zdenek Vor, Akersbergs, Sweden

[73] Assignee: Allmanna Ingenjorsbyran AB, Stockholm, Sweden

[22] Filed: July 26, 1974

[21] Appl. No.: 492,165

[52] U.S. Cl. ............................... 210/279; 210/80; 210/292
[51] Int. Cl.² ................. B01D 23/16; B01D 23/20
[58] Field of Search ............... 210/80, 81, 82, 274, 210/275, 279, 285, 291, 292, 263

[56] References Cited
UNITED STATES PATENTS

| | | | |
|---|---|---|---|
| 524,155 | 8/1894 | Williamson et al. | 210/279 X |
| 879,963 | 2/1908 | Hirt | 210/279 X |
| 2,546,650 | 3/1951 | Nijboer | 210/80 X |
| 3,077,987 | 2/1963 | Morimoto | 210/80 X |
| 3,343,680 | 9/1967 | Rice et al. | 210/263 |
| 3,395,099 | 7/1968 | Johnson | 210/275 X |
| 3,503,505 | 3/1970 | Rensonnet | 210/80 |
| 3,717,251 | 2/1973 | Hampton | 210/80 |

FOREIGN PATENTS OR APPLICATIONS

| | | | |
|---|---|---|---|
| 557,656 | 8/1923 | France | 210/279 |
| 283,363 | 1/1914 | Germany | 210/279 |
| 6,043 | 6/1893 | United Kingdom | 210/292 |

Primary Examiner—Charles N. Hart
Assistant Examiner—Robert G. Mukai
Attorney, Agent, or Firm—Finnegan, Henderson, Farabow & Garrett

[57] ABSTRACT

The present invention relates to a filter provided with a filter bed consisting of a granular material, which does not comprise layers of coarser material. In the filter bed at least one liquid distributor is arranged which defines an expansion space otherwise defined by areas of repose for the bed material, in which space at least one outflow opens above the areas of repose. The distributor is so designed, that the liquid can flow out of the openings with great energy and fill the cavity and fluidize the whole bed, which enables homogenous rinsing of the bed. The opening of the distributor is larger than the mean grain size of the filter bed material and allows fiber, pieces of plastic and similar impurities to pass through the distributor and be removed from the filter.

5 Claims, 7 Drawing Figures

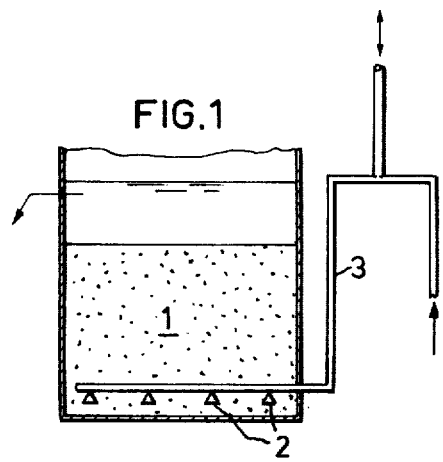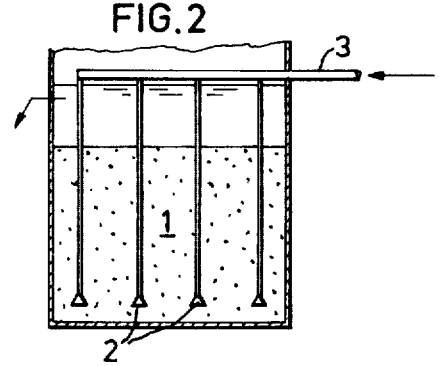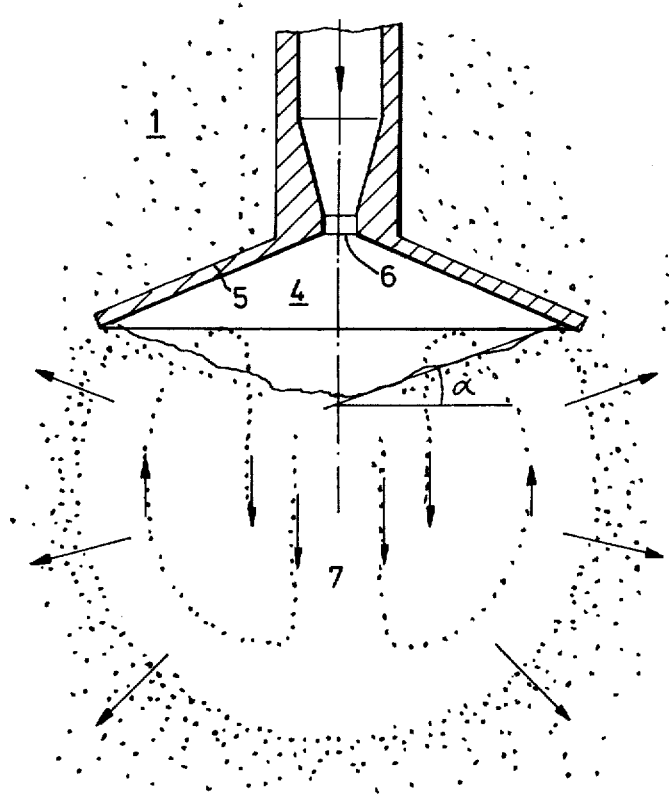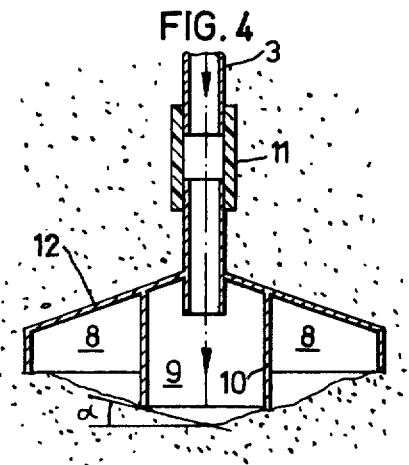

PURIFICATION FILTER FOR LIQUIDS

The present invention relates to a filter provided with a filter bed consisting of a granular material having at least one liquid distributor arranged inside the same.

In the filtering of liquids through a granular bed, for example in water purification in sand filters, different constructions having liquid distributing elements are used in the bottom section of the filter bed, such as jets in a double bottom, perforated tubes or porous plate bottoms. In upstream filtering, the liquid which is to be filtered flows through the elements. In downstream filtering, said elements serve as water outlets. Rinsing liquid is also led through the elements, possibly together with air, into the sand bed during the subsequent rinsing of the filter. With the exception of the holes in the porous plate, the holes in the distributing elements are usually larger than the grains of the bed and there exists an intermediate layer of coarser material, for example shingle, which prevents the fine grained filtering bed from penetrating into the holes or jets. In use with liquids which contain bulkier suspended particles, for example waste water, industrial waste discharge etc. both the construction having a coarse intermediate layer and the construction having porous plates have great disadvantages.

The following disadvantages are made evident when the used filter is to be cleaned. During filtering, suspended impurities are deposited in the fine grained filter bed, often by means of the liquid being provided with flocculent precipitating agents. The filter bed is then cleaned in a fluidized state with the help of a powerful flow of rinsing liquid being passed through the filter bed. However, the coarser intermediate layer does not fluidize and, thus, is cleaned uncontrollably. Filters having porous plates call for periodical dismantling and cleaning with the help of strong acids.

The liquid distributing element should provide an even speed distribution over the entire filter surface both during filtering and rinsing so that the entire bed is used during filtering and so that the rinsing takes place in a uniform manner. During rinsing, the flow is usually ten times as great as it is during filtering and, in this case, it is necessary that the filter bed and the liquid distributing elements cooperate. This cooperation is not satisfactory in filters having a coarse intermediate layer, mainly for the following reasons.

A uniform distribution of liquid is obtained with the help of a pressure loss in the outflow openings, jets and holes. A filter bed has a relatively great hydraulic resistance, especially when the bed is stopped up with sludge. The hydraulic resistance in the holes and jets increases with the square of the flow-through speed and in the filter bed, as well as in the intermediate layer, said resistance increases more or less linearly with the flow-through speed. On the other hand, a bed which has already been fluidized has an almost constant hydraulic resistance independent of the speed. In some cases, even the resistance in a fluidized bed zone decreases with increased speed and, for example in a partially-fluidized bed such as one having a coarser intermediate layer, the ability to regulate the speed during rinsing has been lost. The hydraulic resistance in an intermediate layer of coarser material is ten to twenty times less than the resistance in the filter bed and in the jets. This entails that said layer impairs the distribution conditions and makes cross-flow and concentration of the flow to a very limited zone possible. A good rinsing of the filter bed becomes very difficult to achieve.

The purpose of the present invention is to obtain direct contact between the liquid distributors and the filter bed of finely-granulated material without having an intermediate layer or distributor having holes which are smaller than the grain size in order to thereby overcome the difficulties which in normal cases, arise during rinsing. This is achieved by means of a filter which, according to the invention, is characterized in that a liquid distributor defines an expansion space or cavity at least in an upwards direction inside the filter bed, said space or cavity also being defined by areas of repose for the bed material, and in which space or hollow at least one outflow opening which is larger than the mean grain size of the filter bed material in the areas of repose opens out above the areas of repose and is arranged to concentrate outflowing liquid essentially in a downwards direction towards a small part of the areas of repose.

That which is essential to the filter according to the invention is that the liquid distributors are designed so that the liquid can flow out of the openings with great energy - without being impeded by the outflow openings being smaller than possible particles in the liquid or by said openings being smaller than the grains of the bed — and fill the cavity lying below and fluidize the bed material in said cavity. As it is the energy of the jet of water which fluidizes the sand in the area of repose, the thickness of the jet must be in a certain relation to the mean diameter of the grains of the bed material and larger than said diameter.

In upstream filtering, the filter is used so that a concentrated flow of liquid is passed through an inlet pipe at a speed of for example 40–80 cm/sec., which results in that the sand on the area of repose in the expansion space is stirred and fluidizes in a smaller zone. During subsequent rinsing of the filter, the flow speed is increased approx. 10 times the preceding speed. The water jet passes out of the cavity and penetrates into the sand and, when an energy balance has been achieved, the water jet turns upwards and fluidizes the sand around the hole. The fluidized zone expands and the surrounding granular material fluidizes successively until the entire bed fluidizes.

During downstream filtering, the distributors are used for the outlet of purified liquid. The rinsing process is carried out in the same manner as it is in upstream filtering.

The number of distributors is chosen so that necessary resistance is obtained during rinsing with such openings that allow passage of larger particles and flocks. The rinsing speed is chosen so that even coarser bed material at the bottom fluidizes. Rinsing can take place with liquid or liquid-air mixtures. One or more distributors are arranged on a supply pipe which can be drawn through the filter bed and be connected to horizontal distribution pipes or be fastened to the bottom plate in a filter having a double bottom. The liquid distributor can be of any shape desired, such as a cylinder having a bottom, upset cone, cap or a curved convex disc, as long as it allows a cavity to be formed under the opening. The distributor is preferably cone-shaped having a largest diameter of from one to several decimeters depending on the filter area and the number of distributors. The design choice of the distributor such as the diameter of the supply pipe, the shape of the distributor, etc. is adapted to the filter material which can consist of only sand having a suitable grain curve. Layers of gravel or pebbles or other coarser material is not necessary, nor is it desirable. A few suitable embodiments of the filter according to the invention are shown as examples in the enclosed drawings.

FIG. 1 is a cross section through a filter according to the invention,

FIG. 2 is a cross section through a second embodiment of the filter,

FIG. 3 shows a cross section through a liquid distributor according to the invention and illustrates the flow relationship, FIGS. 4, 5 and 6 show cross sections through other embodiments of the liquid distributor

Figure 5:
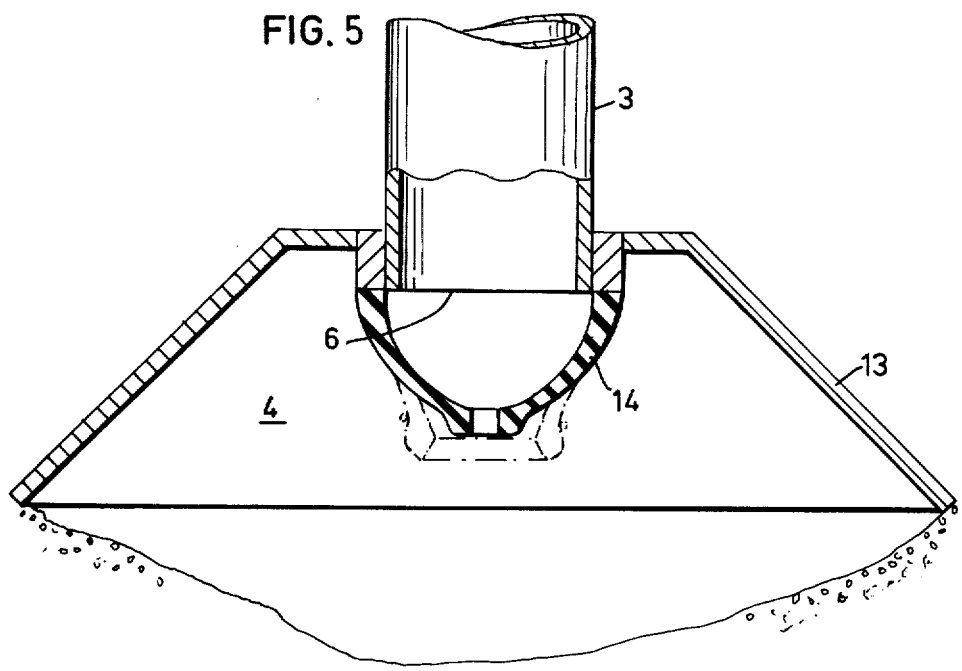

In FIG. 1, one or a plurality of liquid distributors 2 are arranged on a pipe 3 in a filter bed 1 in a housing for an upstream filter. The liquid distributors 2 are fed with water during filtering and rinsing, said feeding taking place through pipe 3 which is ventilated at a point level with the water surface in the filter.

In FIG. 2 each of the liquid distributors 2 in the sand bed 1 are connected to the pipe 3 via a separate vertical pipe, pipe 3 lying above the sand bed.

FIG. 3 illustrates how the bed settles after completed rinsing of the filter. It also illustrates how an expansion space 4 is formed under the distributor 5. Sand penetrates down under the distributor 5 and an area of repose having an incline of α is formed. During the next filtering (in an upstream filter), the water flows at a speed of approx. 80 cm/sec. through the downwardly directed outflow opening 6 and a zone 7 is formed, filled with fluidized sand. During the subsequent rinsing, the speed is 10 times greater and the fluidization zone 7 has a greater size, the outflowing amount increases and the fluidization zone extends over the entire sand bed by means of water flowing from zone 7 into bed 1 as is shown by the arrows.

The expansion space in FIG. 4 is divided into two concentric parts 8 and 9 which are separated by a downwardly directed wall 10 which serves as a flow director. The connection 11 between the distributor 12 and pipe 3 is flexible so as to allow turning of the distributor.

Figure 6:
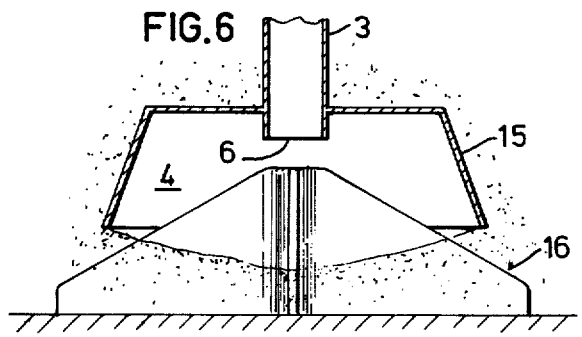

The distributor can also be provided with resilient details in the outflow opening or flow director as is shown in FIGS. 5 and 6 so that the flow-through cross section is adapted to the flow and pressure of the water, which are different during filtering and rinsing.

FIG. 5 shows a liquid distributor 13 in which the outflow opening 6 is provided with a resilient device 14 made of rubber, said device being used for adapting the diameter of the opening 6 to different flow conditions so that the most suitable speed is achieved during filtering and rinsing.

FIG. 6 shows a liquid distributor 15 mounted above a flow director 16 having the shape of a cross, anchored in the bottom of the filter. The liquid distributor can be provided with a resilient rubber element 14 for regulation of the flow-through cross section.

Figure 7:
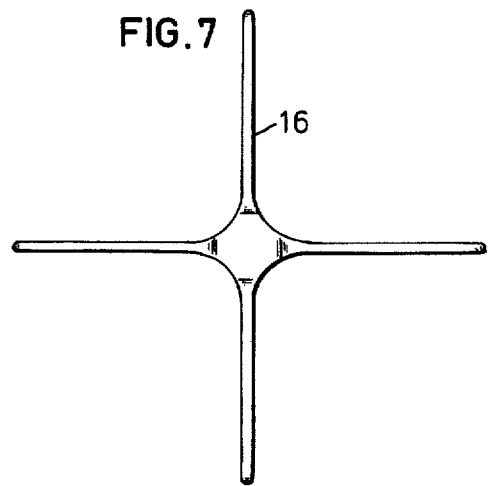
FIG. 7 is a detail view from above of FIG. 6.

FIG. 7 is a detail view from above of the flow director 16 in FIG. 6.

The liquid distributor can be used in upstream and downstream filtering. In downstream filtering, the distributors serve as outlets for the filtrate and as inlets for the rinse water.

The distributor constructions and bed material described above allow filtering of liquids which have only been subjected to limited pretreatment, for example screened waste water. Tests with the distributor according to the above have shown that fiber, coffee grounds, pieces of plastic and similar impurities can pass through the distributor and easily be removed from the filter bed during rinsing as the construction allows material transport and mixing in the bottom layers as well. The latter is an essential advantage compared to filters of more or less pronounced multi media type, in which a remixture of the layers greatly impairs the function.

The distributors make possible the use of liquid-air mixtures during rinsing and, thus, the amount of rinsing liquid can be decreased. The distributors according to the invention do not place such demands on the bed material that the filtering properties of the same are affected in a negative manner, as is the case with other filters. Thus, the distributor can function in an "ideal" filter bed, that is, one that is constructed only for filtering and which is not adapted to other operative technical factors such as, for example the prevention of the bed material from penetrating into the distributors.

What I claim is:

1. An upstream filtering means for liquids having a bed of granular material therein, the grains of which are of approximately uniform mean grain size, and having means embedded in the granular bed for fluidizing the whole bed during a rinsing step comprising a housing, a filter bed of such granular material located within the housing, at least one liquid distributor means that forms a part of said means for fluidizing embedded within the granular material, said distributor means having an enlarged body closed at the top for supporting some of the granular material in the housing above the body and open at the bottom for defining a cavity within said filter bed, said enlarged body being constructed and arranged to cause the granular material to repose under the enlarged body of said distributor means in a manner to generally define the lower wall of said cavity, said lower wall of the cavity being shaped to increase the size of said cavity beyond said space enclosed by said body, said distributor means supporting a downwardly directed nozzle in said cavity, the diameter of said nozzle being larger than the mean grain size of the granular material, a fluid conduit connected to the top of said body and communicating with said cavity through said nozzle, said nozzle having an outlet opening to produce a jet stream of fluid that has a small cross-sectional area as compared with the average cross-sectional area of said cavity, means to supply liquid to said filtering means through said conduit to produce said jet stream flow, said nozzle outlet being situated in said cavity above said lower wall and said jet stream being in a filtration step directed downwardly through said nozzle to flow through said cavity as a concentrated jet and reach the granular material at a local point to fluidize only a portion of the bed under the enlarged body and in a rinsing step the stream flow of the liquid being substantially increased through said bed to fluidize the entire bed.

2. Filter means according to claim 1, characterized in that the cavity is divided into several sections by means of downwardly directed flow directors which are integral with the distributor.

3. Filter means according to claim 1, characterized in that the cavity is divided into several sections by means of flow directors which are attached to the housing.

4. Filter means according to claim 1, characterized in that the nozzle is resiliently suspended from said fluid conduit.

5. Filter means according to claim 1, characterized in that the nozzle has an opening that is provided with resilient lip means which lip means enlarges the cross section of the nozzle opening in relation to the velocity of the rapidly moving stream of liquid.

* * * * *